United States Patent [19]
Reinke

[11] 3,842,859
[45] Oct. 22, 1974

[54] IRRIGATION PIPE GATE VALVE WITH FLOW CONTROL

[76] Inventor: Richard F. Reinke, Box 480, Deshler, Nebr. 68340

[22] Filed: Jan. 4, 1973

[21] Appl. No.: 321,039

[52] U.S. Cl................... 137/504, 137/236, 137/608
[51] Int. Cl............................................ E02b 13/00
[58] Field of Search ............ 137/504, 505, 25, 236; 138/44; 61/13

[56] References Cited
UNITED STATES PATENTS

| | | | |
|---|---|---|---|
| 2,307,949 | 1/1943 | Phillips | 137/504 |
| 2,704,553 | 3/1955 | DeVerteuil | 137/504 X |
| 2,865,397 | 12/1958 | Chenault | 137/504 |
| 3,381,708 | 5/1968 | Chenoweth | 137/504 |
| 3,518,831 | 7/1970 | Tibbals, Jr. et al. | 137/504 X |

Primary Examiner—William R. Cline
Assistant Examiner—Robert J. Miller
Attorney, Agent, or Firm—Clarence A. O'Brien; Harvey B. Jacobson

[57] ABSTRACT

A gated irrigation pipe employing water flow gates which control the volume of water discharged from each gate of the gated irrigation pipe regardless of the pressure in the pipe. The water flow gate is in the form of a valve mounted in a standard irrigation pipe and the disclosure includes multiple embodiments each of which controls the quantity of water discharged from the gate per unit of time in order to attain a balanced flow of water through the gates of the irrigation pipe thereby providing a uniform flow of water into each row or furrow with variation of pressure in the pipe within normal limits not affecting the rate of discharge of water through each gate. In each arrangement, a spring-biased member is provided in the flow path of water being discharged to regulate a valve structure located upstream of the member.

15 Claims, 10 Drawing Figures

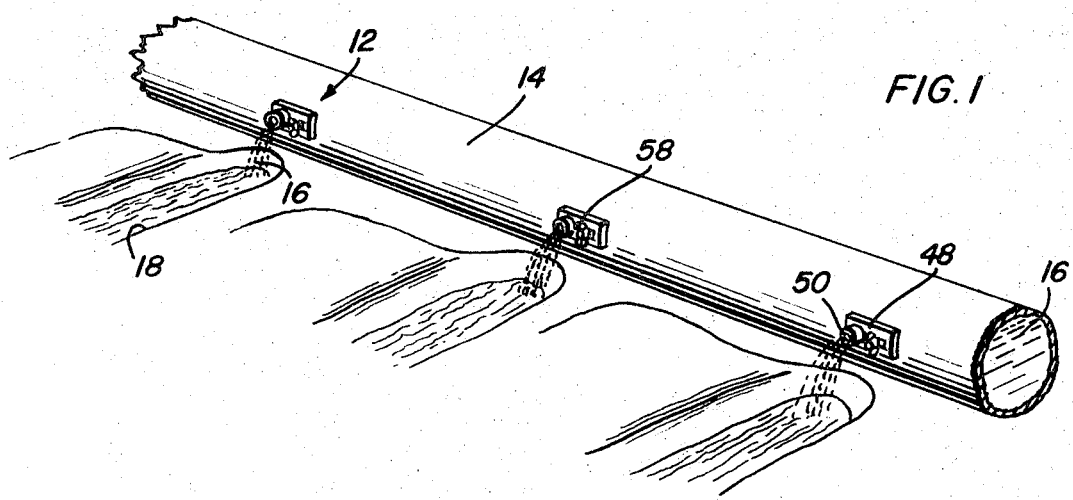
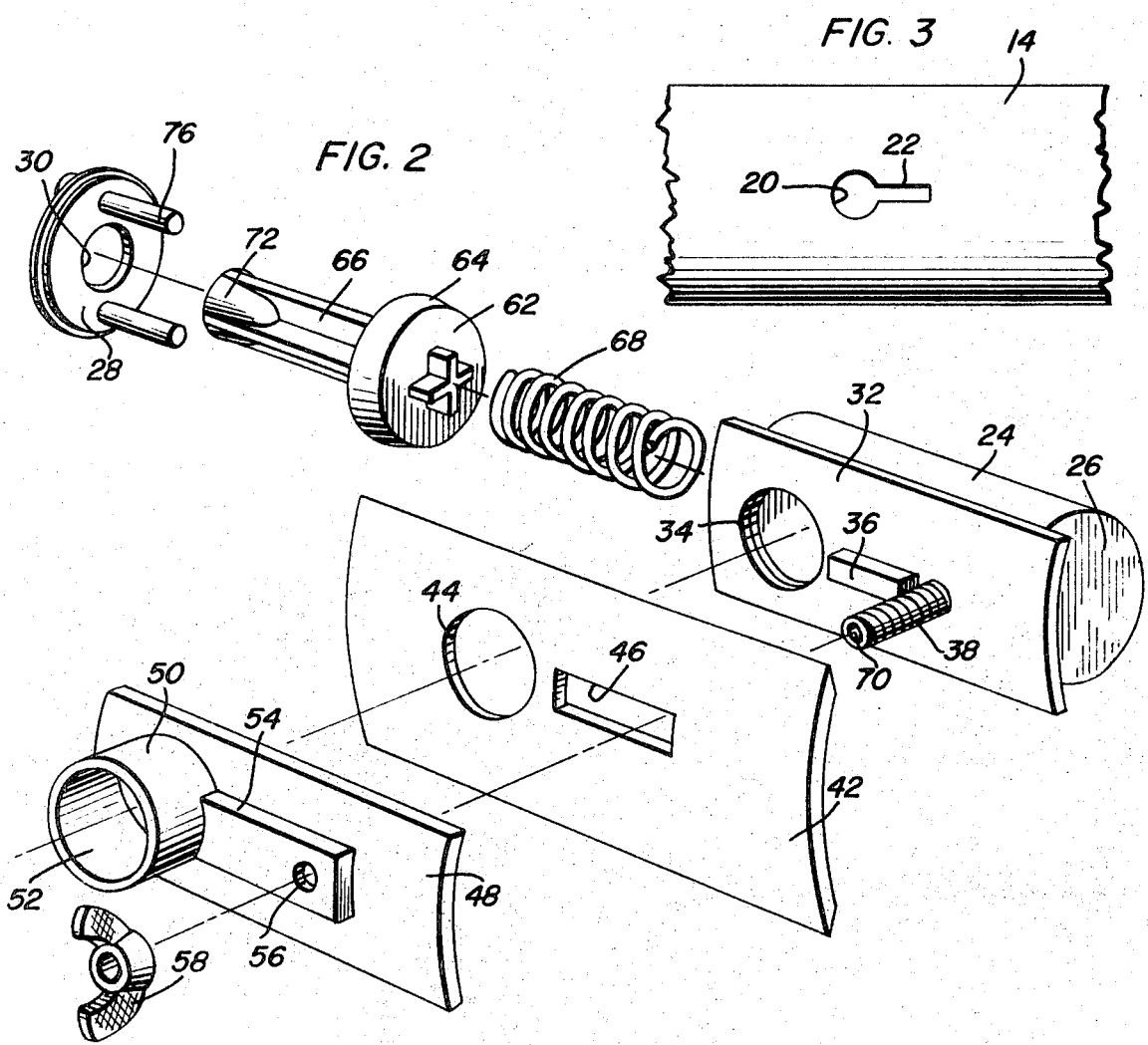

PATENTED OCT 22 1974

IRRIGATION PIPE GATE VALVE WITH FLOW CONTROL

BACKGROUND OF THE INVENTION

1. Field of the Invention

The present invention generally relates to an irrigation pipe gate or valve and more particularly a flow gate which controls the volume of water discharged through an irrigation pipe gate to maintain a given discharge rate of water regardless of pressure variations in the pipe.

2. Description of the Prior Art

Gated irrigation pipes are well known for discharging water into furrows or rows. In conventional practice, structures are provided in the form of adjustable flow gates that enable adjustment of the size of the gate or opening in the irrigation pipe. This type of structure enables the size of the opening in the gated irrigation pipe to be varied by closing or opening the gate manually. The problem with conventional flow gates is that when one or more gates are closed, the pressure builds up in the pipe and water will flow out of the other gates in the pipe faster and, of course, the opposite occurs if the flow gates are open so that it is virtually impossible for an irrigator to balance the gates or valves in order to obtain a uniform flow rate of water through each gate and into each row or furrow. Thus, while manually adjustable flow gates in irrigation pipes are known and have been used to enable at least some variation in the rate of discharge through each of the gates, once the size of the opening has been set, variations in pressure in the pipe results in substantial fluctuation or variation in the flow rate through each flow gate of the gated irrigation pipe.

SUMMARY OF THE INVENTION

An object of the invention is to provide a water flow gate or valve mountable in each gate or opening in a standard gated irrigation pipe that incorporates a piston in the flow path of water being discharged, spring means associated with the piston for biasing it in a direction opposite to the direction of movement of the piston caused by water impinging on or engaging the piston during discharge from the irrigation pipe together with a valve associated with the piston to vary the effective size of the discharge opening thereby controlling the rate of discharge of water from the irrigation pipe in response to the volume of water being discharged and regardless of pressure change of water in the irrigation pipe.

A further object of the invention is to provide a flow gate in which the valve incorporated therein is provided with a tapering surface associated with a substantially circular opening to provide for variation of the effective size of the opening during movement of the valve in relation to the opening.

A further important object of the invention is to provide a flow gate in which various specific embodiments may be provided which may be considered a volume flow controlled regulator which is easily incorporated into standard irrigation pipes, is relatively inexpensive to manufacture and provides for more accurate control of the volume of discharge in order to obtain a uniform flow of water into each irrigation furrow.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a segment of a gated irrigation pipe illustrating flow gates or valves in accordance with the present invention incorporated therein.

FIG. 2 is an exploded group perspective view of the components of the flow gate of this invention.

FIG. 3 is a fragmental elevational view illustrating the opening formed in the irrigation pipe.

DESCRIPTION OF THE PREFERRED EMBODIMENTS

Figure 4:
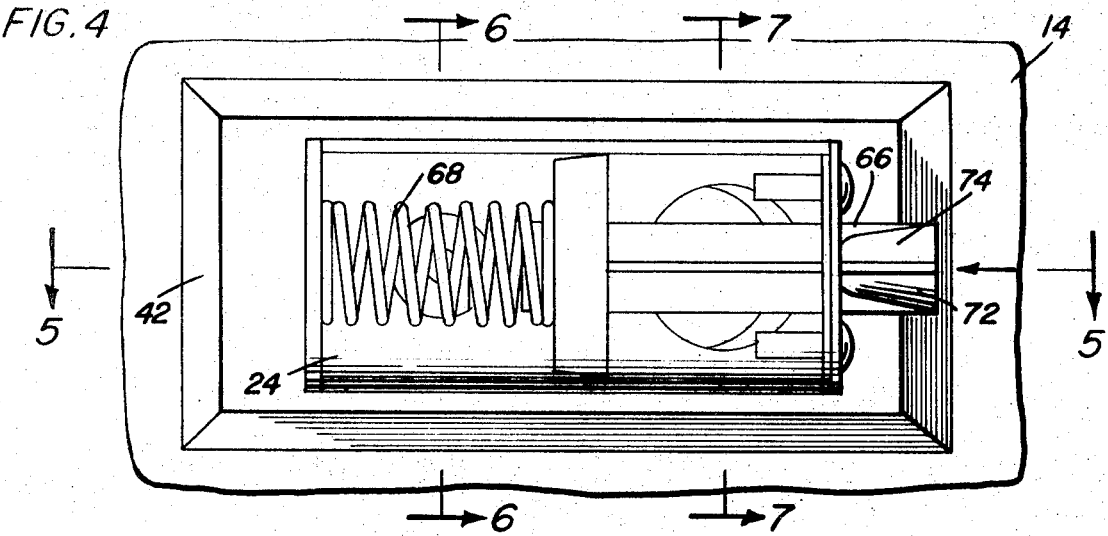
FIG. 4 is an elevational view of the flow gate from the interior of the irrigation pipe.

Referring now specifically to the drawings and FIGS. 1–7 in particular, the flow gate of the present invention is generally designated by the numeral 12 and is installed in a conventional irrigation pipe 14 at longitudinally spaced positions thereon for controlling the flow of water 16 at each furrow 18, row or the like with it being an object of the invention to provide uniform discharge of water 16 into each furrow, row or ditch 18 even though pressure conditions in the irrigation pipe may vary.

The irrigation pipe 14 is conventional pipe constructed of aluminum or other desired material of a suitable diameter and the pipe is provided with a plurality of circular openings 20 each of which is provided with a laterally extending slot 22 associated therewith which parallels the longitudinal axis of the pipe 14 and which is on the downstream side of the pipe as compared with the circular opening 20. Thus, the circular openings 20 and the slot 22 associated with each of them define a plurality of keyhole-shaped apertures or openings in the pipe which are aligned longitudinally with each other and which are longitudinally spaced a predetermined dimension corresponding with the spacing between the furrows 18.

The flow gate 12 includes a cylinder 24 disposed interiorly of the pipe 14 with the downstream end of the cylinder being closed by an end wall 26 and the upstream side of the cylinder including an end wall 28 having an inlet aperture 30 formed therein which is of circular configuration. The cylinder 24 is rigid with and integral with an arcuate mounting plate 32 that has an arc of curvature corresponding with the curvature of the pipe 14. The plate 32 includes a circular aperture 34 therein adjacent one end thereof, a longitudinally extending projecting lug 36 of rectangular configuration and a laterally extending threaded mounting stud 38 all of which are in alignment and spaced from each other as illustrated in FIG. 2. The opening 34 is the same size as and is in alignment with an opening 40 in the peripheral wall of the cylinder 24 thus communicating with the interior of the cylinder.

An arcuate sealing plate 42 is engaged with the surface of the arcuate plate 32 and includes an aperture 44 in alignment with the aperture or opening 34 and also an aperture or opening 46 of rectangular configuration for receiving both the projection 36 and the threaded stud 38. The sealing plate 42 is constructed of resilient material and is arcuately formed to the configuration of the interior surface of the pipe 14 and the surface of the plate 32 thus forming a seal for the openings or apertures 40, 34 and 44 which are in alignment with the circular aperture 20. The aperture 46 receives the projection 36 and the stud 38 which also extend through the slot 22 in the pipe 14.

Disposed exteriorly of the pipe 14 is a longitudinally extending arcuate plate 48 having a short tubular member 50 rigid therewith and which defines a passageway 52 therethrough which is in communication with the aperture 20 when the inner surface of the plate 48 is engaged with the external surface of the pipe 14. The plate 48 is provided with a longitudinal reinforcement 54 joined with the tubular member at one end thereof and provided with an opening or aperture 56 at the upper end which is in a position to receive the threaded stud 38 when the plate 48 is assembled with respect to the pipe 14 and the seal 42, plate 32 and cylinder 24. A wing nut 58 is threaded on the stud 38 in the manner illustrated in FIG. 5 to retain the flow gate in assembled position. Also, the inner surface of the plate 48 is provided with a recess 60 that corresponds in configuration to the projection 36 and which receives the outer end of a projection or lug 36 thereby retaining the components in properly registered relationship.

Inasmuch as the slot 22 is in communication with the circular opening 20, the entire flow gate assembly may be adjusted longitudinally of the pipe 14 by loosening the wing nut 58 thus enabling the effective dimension of the opening 20 to be varied by varying the aligned relationship of the opening 20 with the openings 40, 34, 44 and passageway 52. Thus, the opening 20 may be completely blocked or opened to any degree desired by manually adjusting the flow gate longitudinally of the pipe 14. However, normally, the device is adjusted so that communication is provided between the interior of the pipe 14 and the discharge tube 50 for discharging water into the furrows 18.

Movably disposed within the cylinder 24 is a piston 62 of circular configuration provided with a peripheral inclined edge 64 which tapers to a feather edge seal with the interior of the cylinder 24 with the cup-shaped side of the piston 62 facing the opening 30. Rigid with the piston 62 and extending therethrough is an elongated piston rod 66 of cruciform transverse configuration with the piston rod 66 extending a relatively short distance to the side of the piston 62 remote from the opening 30 and extending a relatively long distance and through the opening 30 as illustrated in FIG. 5 with the space defined by the webs or ribs of the piston rod 66 providing for passage of water through the opening 30 into the interior of the cylinder 24 with the peripheral edge 64 of the piston 62 forming a seal with respect to the interior of the cylinder 24 and thus confining the water to that area of the cylinder having the opening 40 therein.

Figure 5:
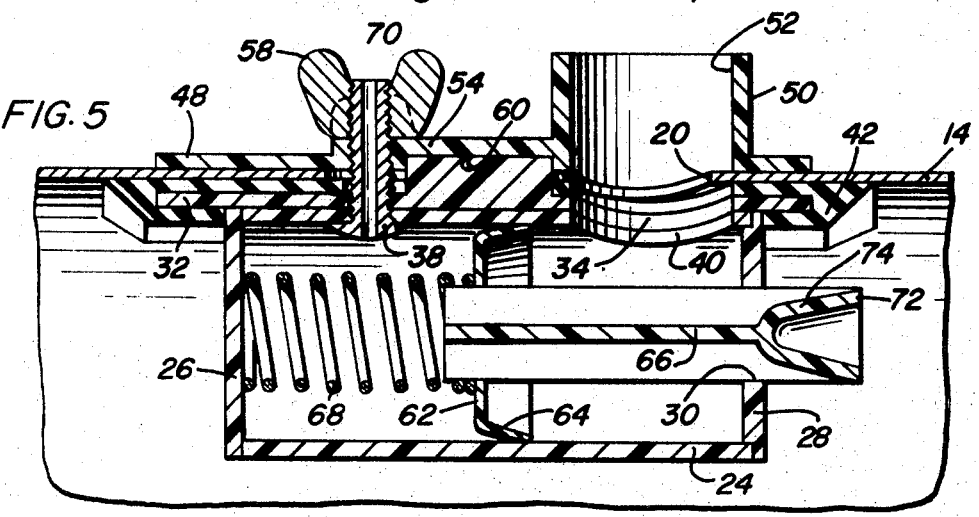
FIG. 5 is a longitudinal, vertical sectional view taken substantially upon a plane passing along section line 5—5 of FIG. 4 illustrating the structual details of the flow gate of the present invention.
Figure 6:
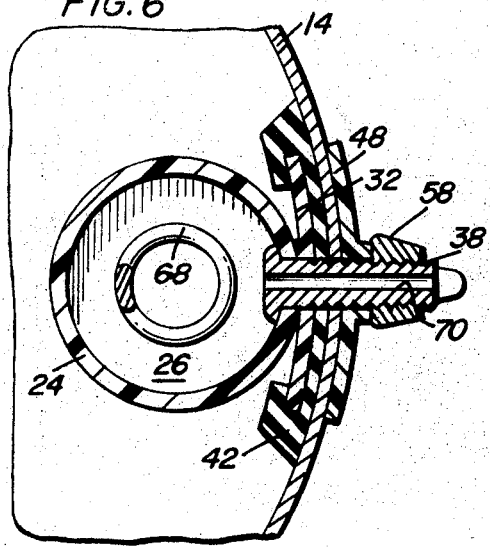
FIG. 6 is a transverse, sectional view taken substantially upon a plane passing along section line 6—6 of FIG. 4 illustrating further structural details of the flow gate.
Figure 7:
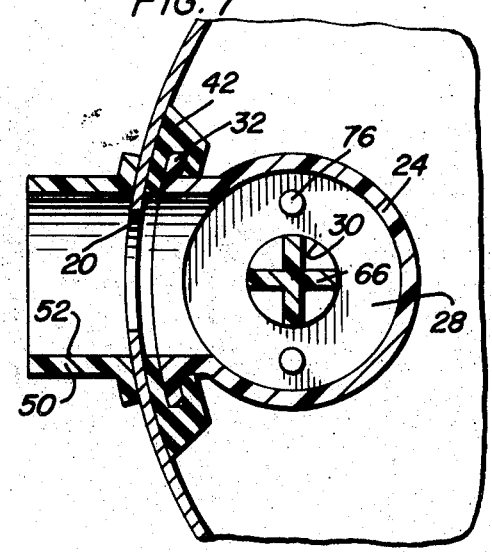
FIG. 7 is a transverse, sectional view taken substantially upon a plane passing along section line 7—7 on FIG. 4 illustrating additional details of the flow gate.

The piston 62 is retained generally in a central position within the cylinder 24 by a coil compression spring 68 having one end abutting the inner surface of the end wall 26 of the cylinder 24 and having the other end encircling and secured to the end of the piston rod 66 which extends through the piston 62 as illustrated in FIG. 5. To assure that no water will become entrapped between the piston 62 and the end wall 26, the stud 38 which extends completely into the interior of the cylinder through the plate 32 and peripheral wall of the cylinder 24 is hollow throughout thereby defining a passageway 70 for drainage of any water which passes the piston 62. Thus, the passageway 70 defines a weep hole so that any fluid leaking past the piston can be discharged so that no pressure will be built-up behind the piston to hinder its free movement which, of course, is governed by the resistance to such movement by the spring 68 which in its normal, relaxed state will orient the piston 62 generally centrally of the cylinder 24 as illustrated in FIG. 5.

The end of the piston rod 66 remote from the piston 62 is provided with a valve 72 which is generally conical in configuration with its external surface 74 tapering from a small inner diameter to a large outer diameter. The valve 72 is integrally formed with the piston rod 66 and has its major diameter at the outer end thereof the same as or substantially the same as the outer periphery of the piston rod which is substantially the same diameter as the opening 30. Thus, as the valve 72 and piston rod move inwardly in relation to the end wall 28, the valve 72 will progressively close the effective size of the opening 30 by virtue of its increase in diameter. Movement of the valve 72 inwardly towards its closed position in relation to the opening 30 is resisted by the spring 68. Any tendency of the piston 62 to move in the direction towards the end wall 28 will be limited by a pair of stop members in the form of longitudinally extending rods 76 that are diametrically opposed in relation to the cylinder and may be in the form of resilient studs rigidly fixed to the end wall 28 in a sealed manner. Thus, even if reverse flow of water or other forces tended to move the piston 62 to the right when viewed in FIG. 5, the stops 76 would limit such movemnt so that at least a portion of the opening 40 would be open to enable flow from the interior of the pipe to the exterior thereof so that such flow impinging on the piston 62 would move the piston back to its normal position so that the spring 68 would resist movement to the left from the central position illustrated in FIG. 5.

The piston and the piston rod 66 or plunger having the valve 72 thereon all move as a unit with axial inward movement of the plunger and coneshaped valve causing a diminish or decrease in the flow of water when the valve moves into the opening and an increase in the flow as it moves out into the pipe stream of water. The spring normally retains the valve in open position but water pressure on the piston or water flow against the piston 62 will move the piston to the left against the resistance of the spring thereby closing the valve or moving it towards closed position as the volume of flow increases through the opening 30 and through the openings 40, 34, 44 and passageway 52. As the volume of flow increases, the piston 62 will be moved to the left or towards the downstream side of the pipe thus decreasing the effective inlet area for water through the opening 30 thus automatically controlling the volume of water flow through the flow gate. By indexing the position of the flow gate or by adjusting its position in relation to the opening 20, the desired rate of discharge flow can be determined by either completely or partially covering the hole in the pipe which provides an exact amount of gallons per minute discharge as desired from the gate with the discharge flow being regulated and controlled and maintained substantially constant regardless of the pressure in the pipe within practical limitations with this discharge rate being controlled at any desired setting.

The utilization of the flow gate 12 at each gate or opening in the irrigation pipe eliminates the problem of adjusting a series of flow gates of the conventional type which usually results in pressure buildup or pressure reduction when one or more of the conventional flow gates are closed or opened which makes it substantially impossible for an irrigator to balance conventional valves in order to obtain a uniform flow of water in each furrow. With this invention, the volume of water to be discharged can be set at a predetermined rate and variation of pressure in the irrigation pipe will not effect the volume of flow.

Figure 8:
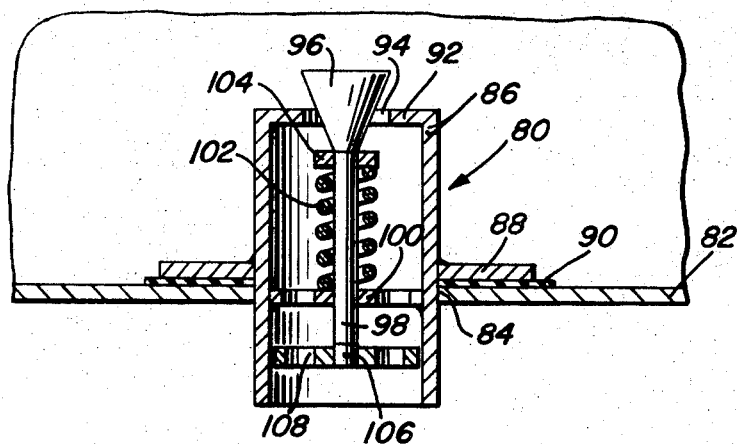
FIG. 8 is a sectional view of another embodiment of the flow gate of the present invention.

FIG. 8 illustrates another embodiment of the flow gate generally designated by reference numeral 80 and which also is incorporated into an irrigation pipe 82 having an opening 84 therein. The flow gate 80 includes a cylindrical member 86 inserted through the opening 84 and either secured to the interior or exterior surface thereof by a peripheral flange or lugs 88 thereon sealed to the pipe 82 by a seal 90 with suitable fastening devices securing the flange in position.

The inner end of the cylinder or casing 86 is provided with an end wall 92 having an opening 94 therein which communicates with the interior of the pipe 82. A conical valve 96 having a valve stem 98 fixed thereto is movable in relation to the opening 94 to vary the effective area of the inlet opening 94. The valve stem is slidably received in an apertured guide plate 100 in the casing 92 and a spring 102 encircles the valve stem with one end engaging the guide plate 100 and the other end engaging a flange 104 rigid with the valve stem to urge the valve 96 toward open position. The outer end of the stem 98 is connected to a baffle plate 106 having apertures 108 therein with the baffle plate being movably disposed within the outer end of the casing 86 so that water passing through the apertures 108 will tend to move the baffle plate 106 outwardly in relation to the casing 86 thus compressing the spring 102 and moving the valve 96 toward its closed position in relation to the opening 94 thereby controlling the volume of discharge of water in the same manner as the device disclosed in FIGS. 1–7.

Figure 9:
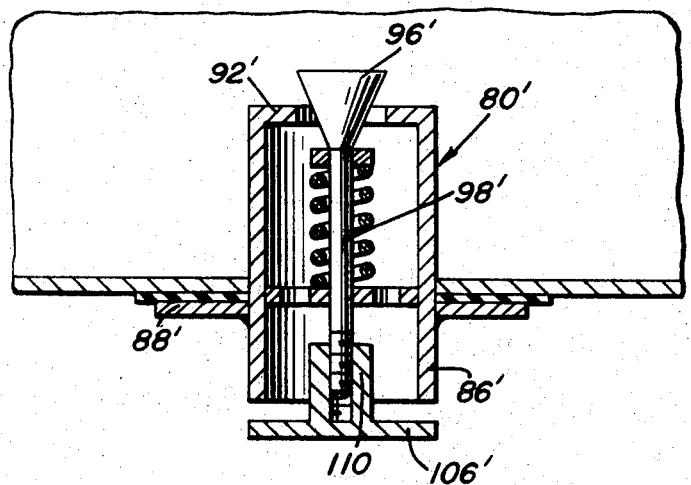
FIG. 9 is a sectional view of another embodiment of the flow gate.

FIG. 9 illustrates another embodiment of the invention which has substantially the same internal structure as that in FIG. 8 with primed reference numerals being used to indicate the comparable structure. In this construction, the baffle plate 106' is oriented beyond the outer end of the casing 86' and is provided with a centrally disposed internally threaded sleeve 110 which is adjustably engaged with the threaded outer end of the valve stem 98'. The capability of the solid baffle plate 106' to be screwed inwardly and outwardly in relation to the casing 86' enables variation in the volume flow of water through the flow gate 80'. Also, note that in this embodiment of the invention, the external mounting of the flange 88' is illustrated.

Figure 10:
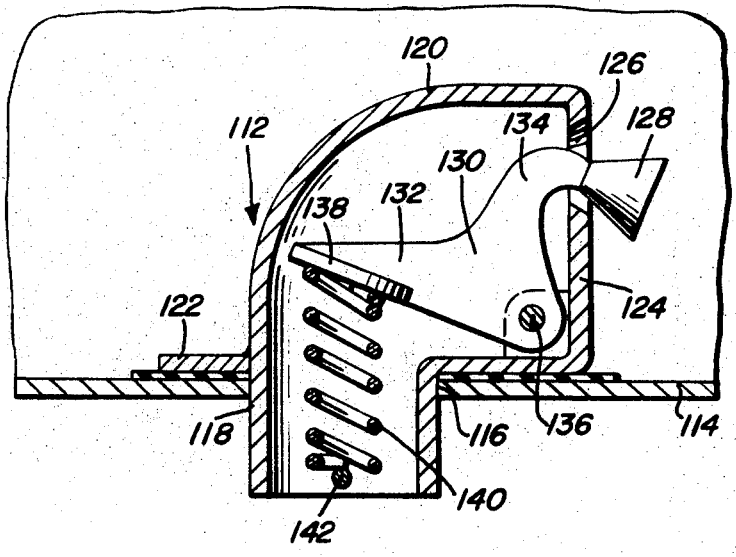
FIG. 10 is a sectional view of a further embodiment of the flow gate.

FIG. 10 illustrates another embodiment of the flow gate generally designated by the numeral 112 installed in an irrigation pipe 114 having an opening 116 therein receiving a discharge tube 118 which is of generally L-shaped configuration with the inner end thereof being enlarged and designated by numeral 120 and generally perpendicular to the end thereof which extends through the opening 116. The tubular member 118 is secured in position by attaching flanges, lugs or the like 122 in a sealed manner in relation to the opening 116. Also, the inner enlarged end 120 is closed by an end plate 124 which faces the upstream of the pipe 114 and is provided with an inlet opening 126 therein which may be tapered to generally correspond with a substantially conical valve 128 that is mounted on one arm of a bell crank or equivalent lever 130 which includes a second arm 132 generally perpendicular to the arm 134 on which the valve 128 is mounted. The apex of the bell crank or lever 130 is pivotally supported by a bracket and pin assembly 136 located at the juncture between the end wall 124 and the outer portion of the wall defining the casing 120 including in its construction the capability of pivotal movement of the lever 130 so that the valve 128 may move toward and away from the opening 126 which may be generally in the form of a valve seat. The arm 132 of the lever 130 is provided with a plate-like abutment thereon 138 which is engaged by a coil spring 140 that extends outwardly into the portion of the casing 118 extending outwardly from the pipe 114 with the outer end of the spring being anchored to a transverse pin 142 so that the spring 140 biases the valve 128 away from the opening 126 in the position illustrated in FIG. 10 and when water flows through the inlet opening 126 and out through the tubular casing 118, the impingement of such water upon the plate 138 will cause the lever 130 to swing in a counterclockwise manner and cause the valve 128 to move towards the opening 126 for reducing the area of the water inlet to the casing 120 for controlling the flow of the same manner as in the previously described embodiments of the invention.

Various materials including plastics may be employed in constructing the flow gate and the specific orientation and configuration of the valve may be varied as long as it is exposed to the flow path or pressure from the irrigation pipe. With this device, the flow rate of discharge may be adjusted by varying the effective area of the discharge opening through the wall of the pipe with the volume of flow being discharged through each flow gate being regulated or controlled whereby variation in pressure within the pipe will not materially alter the volume of discharge.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an irrigation pipe having a discharge opening therein for discharging water, a flow gate for controlling the rate of discharge of water for maintaining a substantially constant volume of discharge from the pipe during pressure variation of the water in the pipe, said flow gate comprising a valve associated with the opening in the pipe for controlling discharge through the opening, means biasing said valve to an open position to enable maximum flow of water from the interior of the pipe to the exterior thereof, and means operatively associated with the valve for moving the valve toward a closed position against the resistance of the biasing means in response to volume of flow of water from the pipe for controlling the position of the valve in response to volume flow of water from the interior to the exterior of the pipe, said means operatively associated with the valve including a flow responsive member positioned in the flow path of the water on the downstream side of the valve, said flow responsive member including a plate in position for engagement by flowing water on the downstream side of the valve, means connecting the plate to the valve for moving the valve in accordance with movement of the plate, said plate being in the form of a piston, a cylinder receiving said piston, one end of the cylinder having an inlet opening, said valve being positioned in said inlet opening, said means connecting the piston and valve including a rod member rigidly interconnecting the piston and valve for moving the valve with the piston when water engages the piston and moves it longitudinally in the cylinder in response to volume flow.

2. The structure as defined in claim 1 wherein said means biasing the valve to an open position includes a spring device disposed in the cylinder and engaged with the piston for maintaining the piston in a position for retaining the valve open when the spring is in expanded relaxed condition, said spring device offering resistance to movement of the piston upon impingement of water upon the piston as it enters through the inlet opening.

3. The structure as defined in claim 2 wherein said valve is tapered from an inner smaller cross-sectional dimension to an outer larger cross-sectional dimension for association with the inlet opening for progressively decreasing flow of water into the cylinder.

4. The structure as defined in claim 3 wherein said cylinder is provided with an outlet opening in the wall thereof between the piston and the inlet opening, said opening in the cylinder wall being aligned with and communicating with the discharge opening in the pipe, and means mounting the cylinder on the pipe in a manner to vary the alignment position of the opening in the cylinder and the pipe to vary the effective discharge area of the opening in the cylinder and pipe.

5. The structure as defined in claim 4 wherein said rod member connecting the piston and valve is in the form of a piston rod of cruciform configuration slidably guided by reception in the inlet opening with the valve being of unitary construction with the piston rod and having a major diameter substantially equal to the outer periphery of the piston rod.

6. The structure as defined in claim 5 wherein said cylinder mounting means includes a threaded mounting stud extending from the interior of the cylinder through a longitudinal slot in the irrigation pipe to the exterior thereof with a retaining fastener thereon for mounting the cylinder longitudinally adjustably interiorly of the pipe, said stud including a passageway extending therethrough communicating with the interior of the cylinder in remote relation to the inlet opening therein, the end of the cylinder remote from the inlet opening having a closed end with the passageway through the stud venting the closed end of the cylinder to the atmosphere to prevent pressure buildup therein.

7. The structure as defined in claim 6 together with resilient stop means in the end of the cylinder having the inlet opening therein and extending axially toward the piston to limit movement of the piston toward the inlet opening in order to assure that the opening in the cylinder will be communication with the interior of the cylinder at all times.

8. A control device for regulating flow of fluid comprising valve means located in the flow path of the fluid and being capable of opening and closing movement to regulate flow, a control member operatively associated with said valve means for controlling the position thereof, said control member being located in the flow path downstream of the valve means for controlling the position of the valve means in response to the volume of flow past the control member, and means operatively associated with said valve means and control member to bias the valve means toward an open position, said control member being oriented in the flow path whereby engagement of fluid therewith will urge the control member in a direction to move the valve means towards closed position against the resistance of said bias means, said bias mens including a spring device urging said valve means toward open position, said valve means including an opening defining a valve seat and a tapered valve member movable with respect to the opening to provide progressive increase and decrease in the effective area for flow of fluid between the valve member and opening.

9. The structure as defined in claim 8 wherein a plurality of said control devices are positioned in an irrigation pipe having a plurality of discharge openings therein for controlling flow of water therethrough, means mounting each control device adjustably in relation to the pipe for controlling the effective size of the discharge openings, said valve member and control member being interconnected by a rod, said control member being in the form of a piston, a cylinder mounted on the interior of the pipe slidably receiving said piston, said cylinder having an opening in the cylindrical wall thereof in communication with the discharge opening in the pipe, said cylinder having end walls with one end wall having said valve seat therein, said spring device including a coil spring between the piston and the other end wall of the cylinder to bias the piston and valve member toward an open position, and stop means limiting movement of the piston toward the valve seat to prevent movement of the piston to a position that would close the opening in the cylindrical wall of the cylinder.

10. The structure as defined in claim 9 wherein said means mounting the cylinder on the irrigation pipe including a tubular mounting fastener extending from the interior of the cylinder adjacent the end wall which is engaged by the spring through a sealed slot in the irrigation pipe thereby venting the cylinder inwardly of the piston and enabling adjustment of the opening in the cylinder wall in relation to the discharge opening to vary the effective area thereof.

11. The structure as defined in claim 1 wherein said cylinder is disposed radially through the irrigation pipe, said piston including means operatively associated with the cylinder to enable water flow from the inlet opening in the cylinder to the discharge opening, and a spring device associated with said rod member, piston and valve to bias the valve toward open position.

12. The structure as defined in claim 11 wherein said piston is adjustably mounted on the rod member and oriented at one end of the cylinder and having a periphery spaced axially therefrom to enable discharge flow from the cylinder.

13. The structure as defined in claim 11 wherein the inner end of said cylinder is of right angular configuration, said rod interconnecting the piston and valve being of bell crank configuration and pivotally mounted on the cylinder for transmitting movement of the piston to the valve.

14. In an irrigation pipe having a plurality of discharge openings therein for discharging water, a flow gate associated with each opening for controlling the rate of discharge of water for maintaining a substantially constant volume of water discharge from each opening during pressure variation of the water in the pipe, said flow gate comprising a tubular member having an inlet opening in communication with the interior of the pipe and an outlet for discharge of water, a valve associated with the inlet opening in the tubular member for controlling water flow therethrough, spring means biasing said valve to an open position to enable maximum flow of water from the interior of the pipe to the exterior thereof, and means operatively associated with the valve for moving the valve toward a closed position against the resistance of the spring means in response to the volume of flow of water discharged from the pipe for controlling the position of the valve in relation to the inlet opening, said means operatively associated with the valve including a flow responsive member positioned in the flow path of water on the downstream side of the inlet opening and valve, said flow responsive member including plate means positioned for engagement by water, flowing from the inlet opening in the tubular member to the outlet without substantial restriction of such flow for moving the plate means in response to the volume of flow through the outlet means interconnecting the plate means and valve for moving the valve in accordance with movement of the plate means whereby variation in the rate of flow through the outlet results in a corresponding variation in the position of the valve in relation to the inlet opening.

15. The structure as defined in claim 14 wherein said means interconnecting the plate means and valve includes a rigid member, said tubular member defining at least a portion of the flow path of water with the plate means having a peripheral dimension similar to the cross-sectional dimension of the tubular member with the plate means oriented in relation to the tubular member whereby passing through the tubular member will impinge upon the plate means on the downstream side of the valve, said valve and inlet opening being constructed whereby movement of the valve in relation to the inlet opening provides a progressive change in the rate of flow of water through the inlet opening.

* * * * *